US008554268B2

(12) United States Patent
Guo et al.

(10) Patent No.: US 8,554,268 B2
(45) Date of Patent: Oct. 8, 2013

(54) CONTROL METHODS FOR COMMUNICATION DEVICES

(75) Inventors: Maobin Guo, Beijing (CN); Yiou-Wen Cheng, Shulin (TW)

(73) Assignee: Mediatek Singapore Pte, Ltd., Ayer Rajah Crescent (SG)

( * ) Notice: Subject to any disclaimer, the term of this patent is extended or adjusted under 35 U.S.C. 154(b) by 0 days.

(21) Appl. No.: 12/995,494

(22) PCT Filed: Oct. 29, 2010

(86) PCT No.: PCT/CN2010/078249
§ 371 (c)(1),
(2), (4) Date: Dec. 1, 2010

(87) PCT Pub. No.: WO2012/055118
PCT Pub. Date: May 3, 2012

(65) Prior Publication Data
US 2013/0210402 A1    Aug. 15, 2013

(51) Int. Cl.
H04M 1/00    (2006.01)
(52) U.S. Cl.
USPC ...................................................... 455/550.1
(58) Field of Classification Search
USPC ..................... 455/41, 418, 415, 565
See application file for complete search history.

(56) References Cited

U.S. PATENT DOCUMENTS 8,311,577 B2 *   11/2012   Bivens et al. ............... 455/556.1

FOREIGN PATENT DOCUMENTS

| CN | 1725768     | 1/2006  |
| CN | 101325775 A | 12/2008 |
| CN | 101488987 A | 7/2009  |
| CN | 101841786   | 9/2010  |
| EP | 1 841 187   | 10/2007 |

OTHER PUBLICATIONS

International Search Report dated Jul. 28, 2011.
English language translation of abstract of CN 1725768 (published Jan. 25, 2006).
English language translation of abstract of CN 101841786 (published Sep. 22, 2010).

* cited by examiner

*Primary Examiner* — Temica M Beamer
*Assistant Examiner* — Joel Ajayi
(74) *Attorney, Agent, or Firm* — McClure, Qualey & Rodack, LLP

(57) ABSTRACT

A control method for a communication device is provided. The control method includes the steps of: determining whether the communication device is in a wrong communication state when a call of a communication function is made from the communication device, and if the communication device is in the wrong communication state, prohibiting the communication function from being performed by the communication device after the call is finished.

20 Claims, 5 Drawing Sheets

CONTROL METHODS FOR COMMUNICATION DEVICES

CROSS-REFERENCE TO RELATED APPLICATION

This application is a co-pending application which claims priority to PCT Application No. PCT/CN2010/078249, filed Oct. 29, 2010, entitled "Control Methods for Communication Devices" herein incorporated by reference in its entirety.

BACKGROUND OF THE INVENTION

1. Field of the Invention

The invention relates to a control method, and more particularly to a control method for a communication device to prevent unintended dialing.

2. Description of the Related Art

For a current portable communication device, such as a cellular phone, a locking state of a keyboard of the cellular phone may be automatically activated after the cellular phone enters a standby mode or after communication with the cellular phone is finished. However, before the locking state is automatically activated, the cellular phone may be unintendedly operated and continuously make calls. For example, when a cellular phone is put in a pocket of a user, a dial button of the cellular phone may be unintendedly pressed so that calls are continuously made before a locking state of the keyboard is automatically activated; which is referred to as pocket dialing. In this situation, the corresponding receiver(s) answering the unintended call(s) may feel irritated, and additionally, the user will have to pay for the unintended call (s).

Thus, it is desired that a control method for a communication device is provided to prevent unintended dialing.

BRIEF SUMMARY OF THE INVENTION

One exemplary embodiment of a control method for a communication device is provided. The control method comprises the steps of: determining whether the communication device is in a wrong communication state when a call of a communication function is made from the communication device; and if the communication device is in the wrong communication state, prohibiting the communication function from being performed by the communication device after the call is finished.

Another exemplary embodiment of a control method for a communication device is provided. The control method comprises the steps of: determining whether a conversation between the communication device and a remote communication device which communicates with the communication device has occurred when a call of a communication function is made from the communication device; determining whether the communication device is in a wrong communication state according to the determination result of the conversation; and if the communication device is in the wrong communication state, prohibiting the communication function from being performed after the call is finished.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
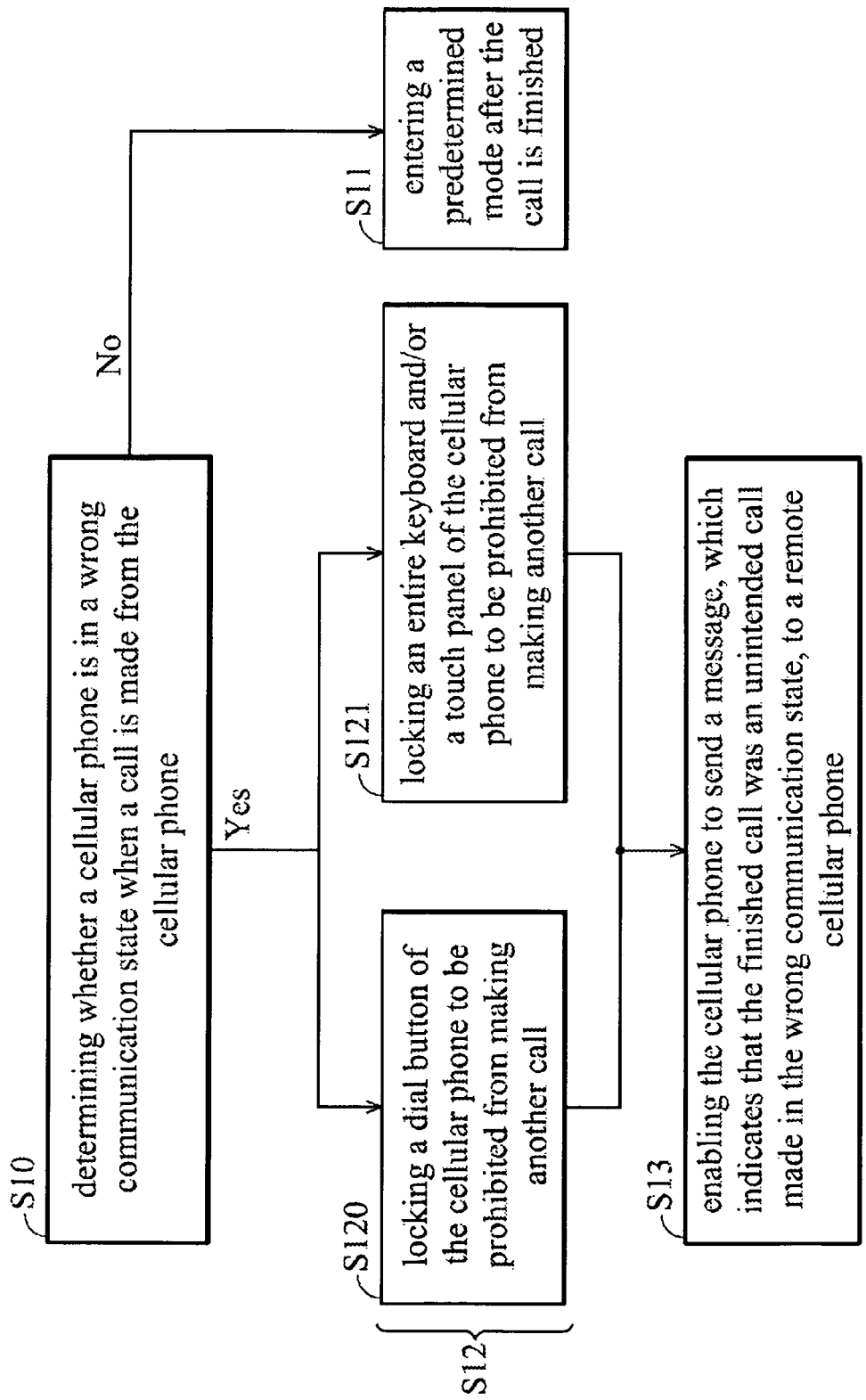
FIG. 1 is a flow chart of an exemplary embodiment of a control method for a communication device.

Control methods are provided. FIG. 1 is a flow chart of an exemplary embodiment of a control method for a communication device. In the embodiment, a communication device communicating with the communication device controlled by the control method during a call is referred to as a remote communication device. As an example in the embodiment, the communication device and the remote communication device are cellular phones. However, in other embodiments, the communication device and the remote communication device may be any portable communication devices. In general, a cellular phone comprises a microphone for receiving a near-end voice from a user of the cellular phone.

Referring to FIG. 1, when a call of a communication function is made from a cellular phone, it is determined whether the cellular phone is in a wrong communication state (step S10). In the embodiment, the wrong communication state occurs when the communication function of the cellular phone device is unintendedly activated. For example, when the cellular phone is put in a pocket, and a dial button of the cellular phone is unintendedly pressed by some objects inside the pocket to activate the communication function to make an unintended call. That is, the call is not a call that a user of the cellular phone wants to make at that time. If the cellular phone is not in the wrong communication state, the cellular phone enters a predetermined mode, such as standby mode, after the call is finished (step S11). If the cellular phone is in the wrong communication state, the communication function can be prohibited from being performed by the cellular phone after the unintended call is finished (step S12). In other words, no unintended call of the communication function can be made from the cellular phone any more. In the step S12, the dial button of the cellular phone can be locked to be prohibited from making another call (step S120). Alternatively, in the step S12, an entire keyboard and/or a touch panel of the cellular phone can be locked to be prohibited from making another call (step S121). In some embodiments, if the cellular phone is in the wrong communication state, the cellular phone can be enabled to send a message, which for example may indicate that the finished call was an unintended call made in the wrong communication state, to a remote cellular phone which communicated with the cellular phone during the finished call (step S13). In other words, the message may indicate that the unintended call to the remote cellular phone was not intentionally made by the user of the cellular phone.

According to the above embodiment, when an unintended call is made, it is determined that the cellular phone is in the wrong communication state. Then, the communication function can be prohibited from being performed. Thus, no unintended call can be made from the cellular phone any more until the communication function is allowed to be performed. Accordingly, after the first unintended call, the cellular phone cannot continuously make unintended call. In other words, before a predetermined locking state of the keyboard is activated, the cellular phone cannot continuously make unintended calls.

Figure 2:
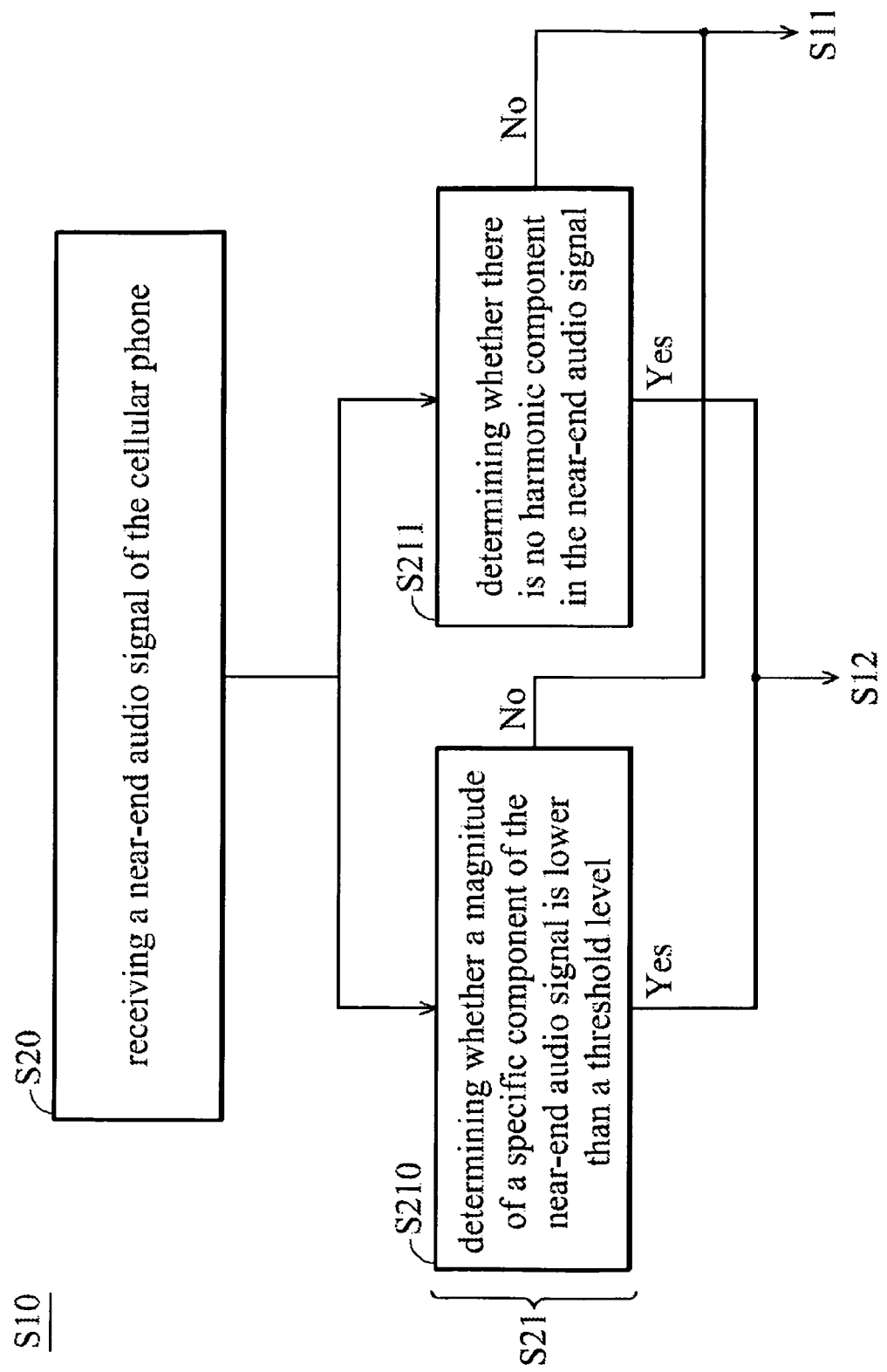
FIG. 2 is a flow chart of one exemplary embodiment of the determination of the wrong communication state in FIG. 1 according to a audio signal.

Whether the cellular phone is in the wrong communication state can be determined according to a near-end audio signal of the cellular phone. FIG. 2 is a flow chart of one exemplary embodiment of the determination of the wrong communication state in the step S10 of FIG. 1 according to a near-end audio signal. Referring to FIG. 2, a near-end audio signal of the cellular phone can be received by the microphone of the cellular phone (step S20), and then the near-end audio signal can be analyzed to determine whether the near-end audio signal has a specific feature (step S21). If the near-end audio signal has the specific feature, it is determined that the cellular phone is in the wrong communication state, and the method proceeds to the step S12. If the near-end audio signal does not have the specific feature, it is determined that the cellular phone is not in the wrong communication state, and the method proceeds to the step S11. In the embodiment, the specific feature may comprise a magnitude of a specific component of the near-end audio signal being lower than a threshold level. In the step S210, it is determined whether the magnitude of the specific component of the near-end audio signal is lower than the threshold level. The specific component of the near-end audio signal may result from human voice, and the magnitude of the specific component varies with a volume of the human voice. In some embodiments, the magnitude of the specific component varies with a volume of the human voice in direct proportion. That is, the magnitude of the specific component increases with an increase in the volume of the human voice, and vise versa. When the user is speaking into the microphone, the magnitude of the specific component is higher than when the user is not speaking into the microphone. When the user is not speaking into the microphone, the magnitude of the specific component is lower than when the user is speaking into the microphone. Accordingly, if the magnitude of the specific component of the near-end audio signal is lower than the threshold level (that is the near-end audio signal has the specific feature), it is determined that the cellular phone is in the wrong communication state, and the method proceeds to the step S12. If the magnitude of the specific component of the near-end audio signal is not lower than the threshold level (that is the near-end audio signal does not have the specific feature), it is determined that the cellular phone is not in the wrong communication state, and the method proceeds to the step S11.

In the embodiment, the specific feature may further comprise inexistence of a harmonic component in the near-end audio signal. In the step S211, it is determined whether there is no harmonic component in the near-end audio signal. One skilled in the art knows that an audio signal resulting from human voice may have a harmonic component. Accordingly, according to the existence of the harmonic component in the near-end audio signal, it is determined that the user of the cellular phone is speaking into the microphone. If there is no harmonic component in the near-end audio signal, meaning that the user is not speaking into the microphone (that is the near-end audio signal has the specific feature), it is determined that the cellular phone is in the wrong communication state, and the method proceeds to the step S12. If there is a harmonic component in the near-end audio signal, meaning that the user is speaking into the microphone (that is the near-end audio signal does not have the specific feature), it is determined that the cellular phone is not in the wrong communication state, and the method proceeds to the step S11.

Figure 3:
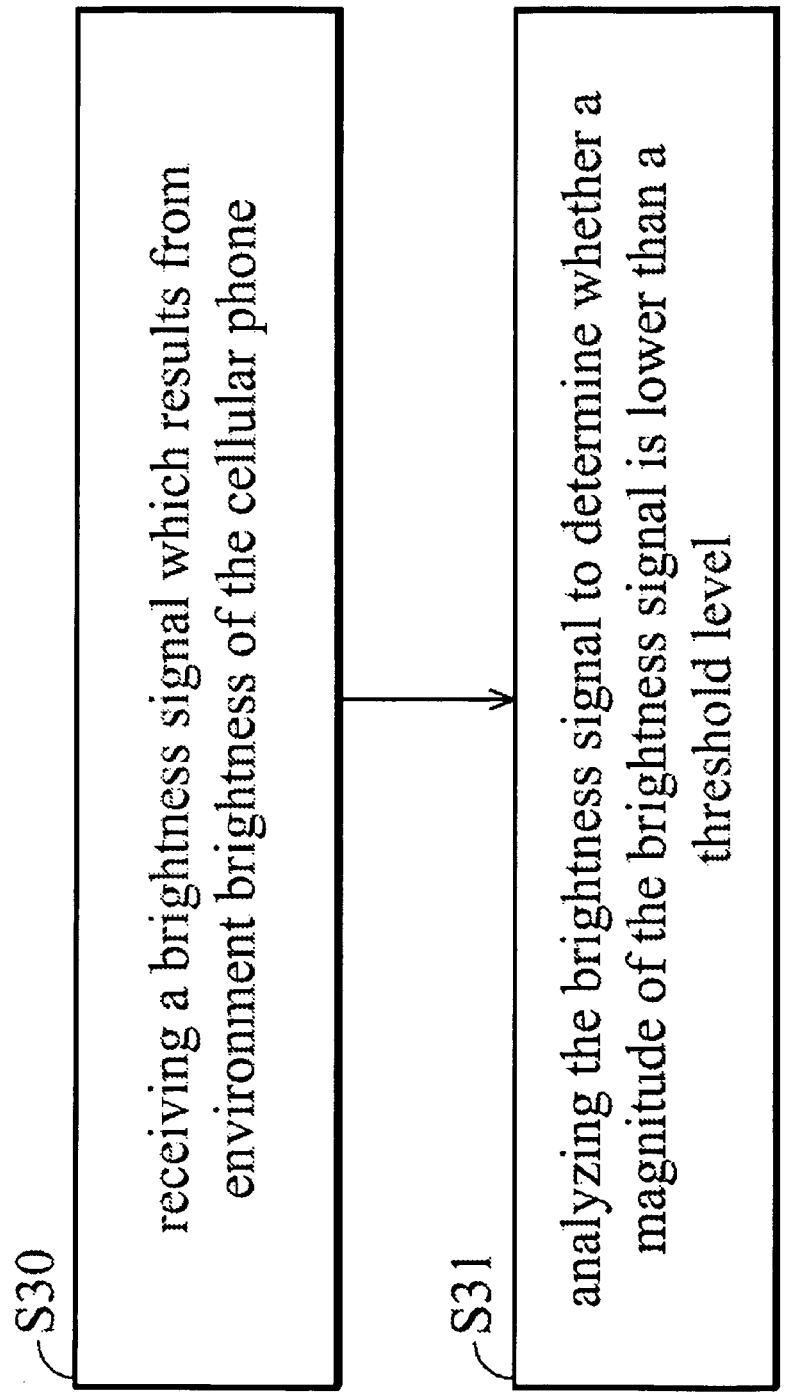
FIG. 3 is a flow chart of another exemplary embodiment of the determination of the wrong communication state in FIG. 1 according to environment brightness.

Whether the cellular phone is in the wrong communication state may further be determined according to environment brightness of the cellular phone. FIG. 3 is a flow chart of another exemplary embodiment of the determination of the wrong communication state in FIG. 1 according to environment brightness. Referring to FIG. 3, a brightness signal which results from environment brightness of the cellular phone is received (step S30), and the brightness signal is analyzed to determine whether the magnitude of the brightness signal is lower than a threshold level (S31). The brightness signal is generated in response to the environment brightness of the cellular phone, which is detected by a detector. In some embodiments, the detector could be a camera, a photodiode or the like of the cellular phone. The magnitude of the brightness signal varies with the environment brightness of the cellular phone. In some embodiments, the magnitude of the brightness signal varies with the environment brightness of the cellular phone in direct proportion. That is, the magnitude of the brightness signal increases with an increase in the environment brightness of the cellular phone, and vice versa. When the magnitude of the brightness signal is lower than the threshold level, it is determined that the cellular phone may be in a pocket of a user or any other container. In the embodiment, the analyzed result of the near-end audio signal in the step S21 and the analyzed result of the brightness signal in the step S31 can both be used to determine whether the cellular phone is in the wrong communication state. The analyzed result of the brightness signal in the step S31 may serve as an auxiliary determination condition. When it is determined that the near-end audio signal has a specific feature in the step S21, and when it is determined that the magnitude of the brightness signal is lower than the threshold level in the step S31, it ensures that the cellular phone is in the wrong communication state. When it is determined that the near-end audio signal does not have a specific feature in the step S21, the analyzed result of the brightness signal in the step S31 can serve as a secondary determination condition. In this case, if the near-end audio signal does not have the specific feature in the step S21 but the magnitude of the brightness signal is lower than the threshold level in the step S31, it may be also determined that the cellular phone is in the wrong communication state.

Figure 4:
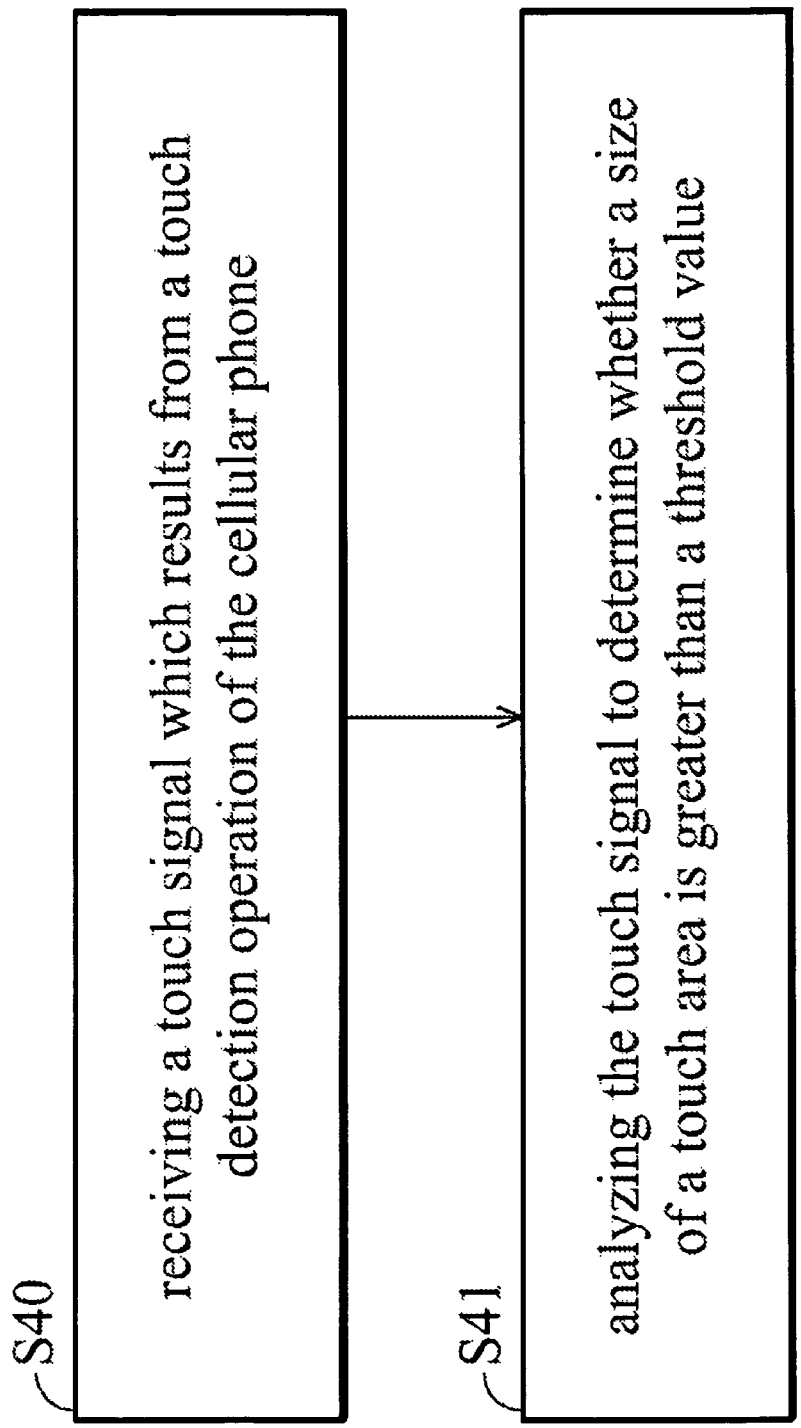
FIG. 4 is a flow chart of another exemplary embodiment of the determination of the wrong communication state 1 in FIG. 1 according to a touch area.

If the cellular phone comprises a touch panel and performs a touch detection operation, whether the cellular phone is in the wrong communication state may further be determined according to a touch area in the touch panel. FIG. 4 is a flow chart of another exemplary embodiment of the determination of the wrong communication state in FIG. 1 according to a touch area. Referring to FIG. 4, a touch signal which results from the touch detection operation of the cellular phone is received (step S40), and the touch signal is analyzed to determine whether a size of a touch area is greater than a threshold value (S41). The touch area is an area by which at least one object contacts the touch panel in the touch detection operation, and the touch signal varies with the size of the touch area. Thus, size of the touch area can be determined according to the touch signal. When the size of the touch area is greater than the threshold value, it is determined that the cellular phone may be in a pocket of the user or any other container and the touch panel may be touched by at least one object inside the pocket or container. In the embodiment, the analyzed result of the near-end audio signal in the step S21 and the analyzed result of the touch signal in the step S41 can both be used to determine whether the cellular phone is in the wrong communication state. The analyzed result of the touch signal in the step S41 may serve as an auxiliary determination condition. When it is determined that the near-end audio signal has the specific feature in the step S21, and when it is determined that the size of touch area is greater than the threshold value by analyzing the touch signal in the step S41, it ensures that the cellular phone is in the wrong communication state. When it is determined that the near-end audio signal does not have the specific feature in the step S21, the analyzed result of the touch signal in the step S41 may serve as a secondary determination condition. In this case, if the near-end audio signal does not have the specific feature in the step S21 but the size of touch area is greater than the threshold value in the step S41, it may be also determined that the cellular phone is in the wrong communication state.

Figure 5:
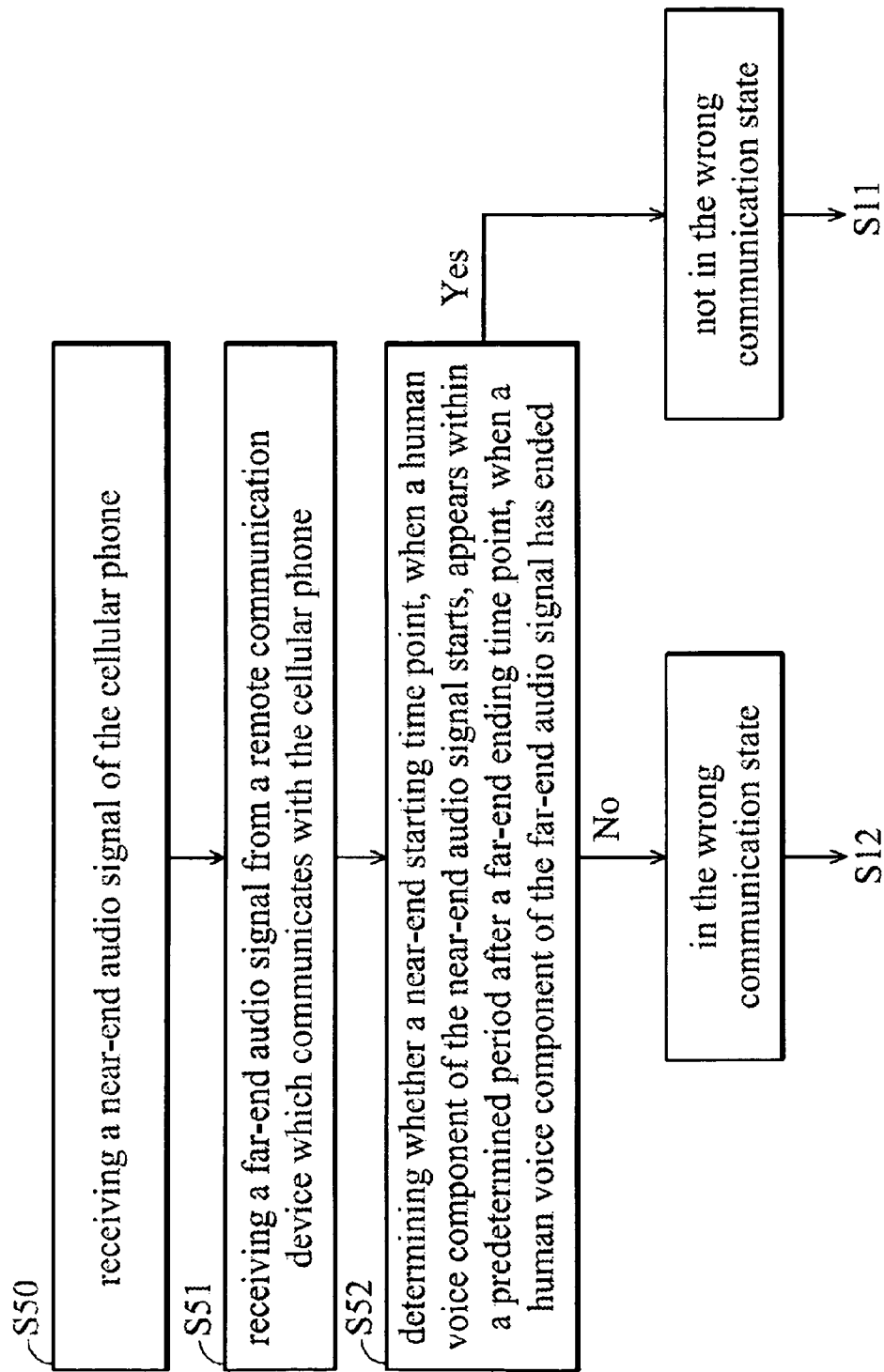
FIG. 5 is a flow chart of further another exemplary embodiment of the determination of the wrong communication state in FIG. 1 according to occurrence of a conversation.

Whether the cellular phone is in the wrong communication state may be determined according to occurrence of a conversation between the cellular phone and a remote cellular phone which communicates with the cellular phone. FIG. 5 is a flow chart of further another exemplary embodiment of the determination of the wrong communication state in FIG. 1 according to occurrence of a conversation. Referring to FIG. 5, a near-end audio signal of the cellular phone can be received by the microphone of the cellular phone (step S50), and a far-end audio signal from the remote communication device, such as a remote cellular phone, may also be received (step S51). Then, it is determined whether a near-end starting time point, when a human voice component of the near-end audio signal starts, appears within a predetermined period after a far-end ending time point, when a human voice component of the far-end audio signal has ended (step S52). In other words, it is determined whether the user of the cellular phone answers the user of the remote cellular phone within the predetermined period after the last spoken word of the user of the remote cellular phone. If the near-end starting time point appears within the predetermined period after the far-end ending time point, it is determined that the conversation between the cellular phone and the remote cellular phone has occurred, so that the cellular phone is not in the wrong communication state, and the method proceeds to the step S11. If the near-end starting time point does not appear within the predetermined period after the far-end ending time point, it is determined that the conversation between the cellular phone and the remote cellular phone has actually not occurred, so that the cellular phone is in the wrong communication state, and the method proceeds to the step S12.

In the embodiment, at least one of the analyzed result of the brightness signal in the step S31 and the analyzed result of the touch signal in the step S41 may serve as an auxiliary determination condition or a secondary determination condition to be used with the determination of the occurrence of the conversation between the cellular phone and the remote cellular phone in FIG. 5 to determine whether then cellular phone is not in the wrong communication state.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for a communication device that prevents the communication device from initiating an unintended call, the method comprising:
   analyzing a combination of a near-end audio signal and an environmental brightness to determine whether the communication device is in a wrong communication state at an end of a current call of a communication function from the communication device; and
   in response to the determining that the communication device is in the wrong communication state, prohibiting the communication function from being performed again by the communication device after the current call has completed.

2. The control method as claimed in claim 1, wherein the step of determining whether the communication device is in the wrong communication state comprises:
   receiving a near-end audio signal of the communication device; and
   analyzing the near-end audio signal to determine whether the near-end audio signal has a specific feature;
   wherein it is determined whether the communication device is in the wrong communication state according to an analyzed result of the near-end audio signal.

3. The control method as claimed in claim 2, wherein the step of analyzing whether the near-end audio signal has the specific feature comprises
   determining whether a magnitude of a specific component of the near-end audio signal is lower than a threshold level;
   wherein the specific component of the near-end audio signal results from human voice, and the magnitude of the specific component varies with a volume of the human voice; and
   wherein in response to the magnitude of the specific component of the near-end audio signal being lower than the threshold level, it is determined that the communication device is in the wrong communication state.

4. The control method as claimed in claim 2, wherein the step of analyzing whether the near-end audio signal has the specific feature comprises:
   determining whether there is no harmonic component in the near-end audio signal;
   wherein when there is no harmonic component in the near-end audio signal, it is determined that the communication device is in the wrong communication state.

5. The control method as claimed in claim 2, wherein the step of determining whether the communication device is in the wrong communication state further comprises:
   receiving a brightness signal which results from environment brightness of the communication device, wherein magnitude of the brightness signal varies with the environment brightness of the communication device; and
   analyzing the brightness signal to determine whether the magnitude of the brightness signal is lower than a threshold level;
   wherein it is determined whether the communication device is in the wrong communication state according to the analyzed result of the near-end audio signal and an analyzed result of the brightness signal.

6. The control method as claimed in claim 1, wherein when the near-end audio signal has the specific feature or when the magnitude of the brightness signal is lower than the threshold level, it is determined that the communication device is in the wrong communication state.

7. The control method as claimed in claim 2, wherein the step of determining whether the communication device is in the wrong communication state further comprises:
receiving a touch signal which results from a touch detection operation of the communication device, wherein at least one object contacts a touch panel of the communication device by a touch area in the touch detection operation, and the touch signal varies with a size of the touch area; and
analyzing the touch signal to determine whether the size of the touch area is greater than a threshold value;
wherein it is determined whether the communication device is in the wrong communication state according to the analyzed result of the near-end audio signal and an analyzed result of the touch signal.

8. The control method as claimed in claim 7, wherein when the near-end audio signal has the specific feature and/or if the size of the touch area is greater than the threshold value, it is determined that the communication device is in the wrong communication state.

9. The control method as claimed in claim 1, wherein the step of prohibiting the communication function from being performed comprises:
locking a dial button of the communication device or locking an entire keyboard or a touch panel of the communication device.

10. The control method as claimed in claim 1 further comprising:
in response to a determination that the communication device is in the wrong communication state, enabling the communication device to send a message which indicates that the finished call was made in the wrong communication state.

11. The control method as claimed in claim 1, wherein the step of determining whether the communication device is in the wrong communication state comprises:
determining whether a conversation between the communication device and a remote communication device which communicates with the communication device has occurred during the call;
wherein in response to a determination that the conversation between the communication device and the remote communication device has actually not occurred, it is determined that communication device is in the wrong communication state.

12. The control method as claimed in claim 11, wherein the step of determining whether the conversation between the communication device and the remote communication device has occurred during the call comprises:
receiving a near-end audio signal of the communication device;
receiving a far-end audio signal from the remote communication device; and
determining whether a near-end starting time point when a human voice component of the near-end audio signal starts, appears within a predetermined period after a far-end ending time point when a human voice component of the far-end audio signal has ended.

13. The control method as claimed in claim 12, wherein when the near-end starting time point does not appear within the predetermined period after the far-end ending time point, it is determined that the communication device is in the wrong communication state.

14. The control method as claimed in claim 1, wherein the wrong communication state occurs when the communication function of the communication device is unintendedly activated.

15. A control method for a communication device that prevents the communication device from initiating an unintended call, the method comprising:
determining whether a conversation between the communication device and a remote communication device which communicates with the communication device has occurred when a current call of a communication function is made from the communication device;
analyzing a combination of a near-end audio signal and an environmental brightness to determine whether the communication device is in a wrong communication state according to the determination result of the conversation, when the current call is terminated; and
in response to determining that the communication device is in a wrong communication state when the current call is terminated, prohibiting the communication function from being performed again after the call has completed.

16. The control method as claimed in claim 15, wherein the step of determining whether the conversation between the communication device and the remote communication device has occurred comprises:
receiving a near-end audio signal of the communication device;
receiving a far-end audio signal from the remote communication device; and
determining whether a near-end starting time point when a human voice component of the near-end audio signal starts, appears within a predetermined period after a far-end ending time point when a human voice component of the far-end audio signal has ended.

17. The control method as claimed in claim 16, wherein when the near-end starting time point does not appear within the predetermined period after the far-end ending time point, it is determined that whether the conversation between the communication device and the remote communication device has not occurred when the call of the communication function is made, and it is determined that the communication device is in the wrong communication state.

18. The control method as claimed in claim 15, wherein the step of prohibiting the communication function from being performed comprises:
locking a dial button of the communication device or locking an entire keyboard and/or a touch panel of the communication device.

19. The control method as claimed in claim 15 further comprising:
in response to a determination that the communication device is in the wrong communication state, enabling the communication device to send a message which indicates that the finished call was made in the wrong communication state.

20. The control method as claimed in claim 15, wherein the wrong communication state occurs when the communication function of the communication device is unintendedly activated.

* * * * *